US012746627B2

(12) United States Patent
Koch et al.

(10) Patent No.: US 12,746,627 B2
(45) Date of Patent: Sep. 29, 2026

(54) FORMING APERTURE(S) IN COMPONENT USING SCALED CT SCAN DATA

(71) Applicant: RTX Corporation, Farmington, CT (US)

(72) Inventors: Robert Koch, Hartford, CT (US); Derek Bialka, Ellington, CT (US)

(73) Assignee: RTX Corporation, Farmington, CT (US)

( * ) Notice: Subject to any disclaimer, the term of this patent is extended or adjusted under 35 U.S.C. 154(b) by 119 days.

(21) Appl. No.: 18/947,910

(22) Filed: Nov. 14, 2024

(65) Prior Publication Data

US 2026/0131408 A1 May 14, 2026

(51) Int. Cl.

| | |
|---|---|
| ***G01N 23/046*** | (2018.01) |
| ***B23P 15/02*** | (2006.01) |
| ***B23P 15/04*** | (2006.01) |
| *B23P 6/00* | (2006.01) |
| *B23P 6/04* | (2006.01) |
| *F01D 5/18* | (2006.01) |

(52) U.S. Cl.

CPC ............... *B23P 15/02* (2013.01); *B23P 15/04* (2013.01); *G01N 23/046* (2013.01); *B23P 6/002* (2013.01); *B23P 6/045* (2013.01); *F01D 5/186* (2013.01); *F05D 2230/80* (2013.01); *F05D 2230/90* (2013.01); *G01N 2223/401* (2013.01); *Y10T 29/49341* (2015.01)

(58) Field of Classification Search

CPC ........... B23P 6/002; B23P 6/045; B23P 15/04; Y10T 29/49341; G01N 23/04; G01N 2223/40; F05D 2230/80; F05D 2230/90; F01D 5/186

See application file for complete search history.

(56) References Cited

U.S. PATENT DOCUMENTS 4,188,544 A 2/1980 Chasson
7,978,322 B2 7/2011 Marsh
(Continued)

FOREIGN PATENT DOCUMENTS

CN 117921318 B 10/2025

OTHER PUBLICATIONS

EP Search Report for EP Patent Application No. 25216057.7 dated Mar. 19, 2026.

*Primary Examiner* — Jermie E Cozart
(74) *Attorney, Agent, or Firm* — Getz Balich LLC

(57) ABSTRACT

During a manufacturing method, a component is scanned with one or more artifacts using a computed tomography machine. The component includes a first member and a second member covering the first member. The first member includes a first member aperture extending through the first member to the second member. Scan data is scaled using known dimensional data for the one or more artifacts to provide scaled scan data. Aperture data is determined for the first member aperture based on the scaled scan data. The aperture data is indicative of a scanned geometry of the first member aperture. A first drilling reference is determined based on the aperture data. A second member aperture is formed in the second member according to a formation operation that aligns the second member aperture being formed with the first member aperture in the first member. The formation operation is determined using the first drilling reference.

20 Claims, 13 Drawing Sheets

(56) References Cited

U.S. PATENT DOCUMENTS

| | | | |
|---|---|---|---|
| 8,857,055 B2 | 10/2014 | Wei | |
| 10,500,678 B2 | 12/2019 | Dong | |
| 10,907,502 B2 | 2/2021 | Bromberg | |
| 2008/0250659 A1 | 10/2008 | Bellerose | |
| 2016/0074969 A1 | 3/2016 | Kriegmair | |
| 2020/0230753 A1 | 7/2020 | Auxier | |
| 2023/0051153 A1 | 2/2023 | Craig | |
| 2023/0052181 A1 | 2/2023 | Craig | |
| 2024/0293892 A1* | 9/2024 | Craig | B23K 26/382 |

* cited by examiner

FORMING APERTURE(S) IN COMPONENT USING SCALED CT SCAN DATA

BACKGROUND OF THE DISCLOSURE

1. Technical Field

This disclosure relates generally to forming an aperture and, more particularly, to forming the aperture in a component.

2. Background Information

A gas turbine engine includes various fluid cooled components such as turbine blades, turbine vanes and hot section flowpath walls. Such fluid cooled components may include one or more cooling apertures extending through a coated sidewall of the respective component. Various methods are known in the art for forming cooling apertures in a coated component. While these known cooling aperture formation methods have various benefits, there is still room in the art for improvement.

SUMMARY OF THE DISCLOSURE

According to an aspect of the present disclosure, a method is provided of manufacture during which a component is scanned with one or more artifacts using a computed tomography machine to provide scan data. The component includes a first member and a second member covering the first member. The first member includes a first member aperture extending through the first member to the second member. The scan data is scaled using known dimensional data for the one or more artifacts to provide scaled scan data. Aperture data is determined for the first member aperture based on the scaled scan data. The aperture data is indicative of a scanned geometry of the first member aperture. A first drilling reference is determined based on the aperture data. A second member aperture is formed in the second member according to a formation operation that aligns the second member aperture being formed with the first member aperture in the first member. The formation operation is determined using the first drilling reference.

According to another aspect of the present disclosure, another method is provided of manufacture during which an engine component and one or more artifacts are computed tomography scanned to provide scan data. The engine component includes a first member and a second member on the first member. The first member includes a first member aperture extending through the first member. The second member covers an end of the first member aperture. The one or more artifacts comprise a first artifact discrete from and arranged with the engine component. The scan data is scaled using known dimensional data for the one or more artifacts to provide scaled scan data. Aperture data is determined for the first member aperture based on the scaled scan data. The aperture data is indicative of a scanned geometry of the first member aperture. A first drilling reference is determined based on the aperture data. A formation operation is tailored to align a second member aperture to be formed in the second member with the first member aperture already formed in the first member based on the first drilling reference. The second member aperture is formed in the second member according to the formation operation.

According to still another aspect of the present disclosure, another method is provided of manufacture during which an engine component is computed tomography scanned to provide scan data. The engine component includes a first member, a second member and one or more artifacts. The first member includes a first member aperture extending through the first member. The second member is disposed over the first member and covers an end of the first member aperture. The one or more artifacts comprise a first artifact configured as a part of the engine component. The scan data is scaled using known dimensional data for the one or more artifacts to provide scaled scan data. Aperture data is determined for the first member aperture based on the scaled scan data. The aperture data is indicative of a scanned geometry of the first member aperture. A first drilling reference is determined based on the aperture data. A formation operation is tailored to align a second member aperture to be formed in the second member with the first member aperture already formed in the first member based on the first drilling reference. The second member aperture is formed in the second member according to the formation operation.

The one or more artifacts may include a first artifact with a known size. The known dimensional data may be indicative of the known size of the first artifact.

The one or more artifacts may include a first artifact and a second artifact with a known distance between the first artifact and the second artifact. The known dimensional data may be indicative of the known distance between the first artifact and the second artifact.

The one or more artifacts may include a first artifact discrete from and arranged with the component.

The one or more artifacts may include a first artifact attached to the component.

The component may be mounted with a fixture during the scanning and the forming. The one or more artifacts may include a first artifact attached to the fixture.

The one or more artifacts may include a first artifact. The component may include the first artifact.

The first drilling reference may be indicative of an exterior point of intersection between (a) an exterior surface of the second member and (b) a centerline of the scanned geometry of the first member aperture.

The first drilling reference may be indicative of an interior point of intersection between (a) an interface between the first member and the second member and (b) a centerline of the scanned geometry of the first member aperture.

The first drilling reference may be indicative of a centerline of the scanned geometry of the first member aperture.

The first drilling reference may be indicative of a center of the scanned geometry of the first member aperture.

The aperture data may be related to a global registration.

The second member aperture may be formed in the second member using a laser.

The second member aperture may be formed in the second member using a water jet.

The second member aperture may be formed in the second member using a mechanical drill.

The second member aperture may be formed in the second member using electrical discharge machining.

The first member may be or otherwise include a ceramic substrate.

The first member may be or otherwise include a metal substrate. The second member may be or otherwise include a ceramic material.

The first member may be or otherwise include a metal substrate. The second member may be or otherwise include a metallic material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods and systems for manufacturing a coated apertured component such as, but not limited to, a coated fluid cooled component. Herein, the term “manufacturing” may describe a method for forming the fluid cooled component; e.g., creating a brand new fluid cooled component. The term “manufacturing” may also or alternatively describe a method for reconditioning, repairing and/or otherwise remanufacturing the fluid cooled component; e.g., restoring one or more features of a previously formed fluid cooled component to brand new condition, similar to brand new condition, or better than brand new condition. The fluid cooled component, for example, may be remanufactured to fix one or more defects (e.g., cracks, wear and/or other damage) imparted during previous use of the fluid cooled component. The fluid cooled component may also or alternatively be remanufactured to fix one or more defects imparted during the initial formation of the fluid cooled component.

The fluid cooled component may be a component of a powerplant for an aircraft. The aircraft may be an airplane, a rotorcraft (e.g., a helicopter), a drone (e.g., an unmanned aerial vehicle (UAV)), or any other manned or unmanned aerial vehicle or system. The aircraft powerplant may be configured as, or otherwise included as part of, a propulsion system for the aircraft. Examples of the aircraft propulsion system include, but are not limited to, a turbofan propulsion system, a turbojet propulsion system, a turboprop propulsion system, a propfan propulsion system, a pusher fan propulsion system, or the like. The aircraft powerplant may alternatively be configured as, or otherwise included as part of, an electrical power system for the aircraft. An example of the aircraft electrical power system is an auxiliary power unit (APU). The present disclosure, however, is not limited to such exemplary aircraft powerplants nor to aircraft applications. The powerplant, for example, may alternatively be configured as a ground-based industrial turbine engine for electrical power generation. However, for ease of description, the powerplant is described below as the aircraft powerplant.

Figure 1:
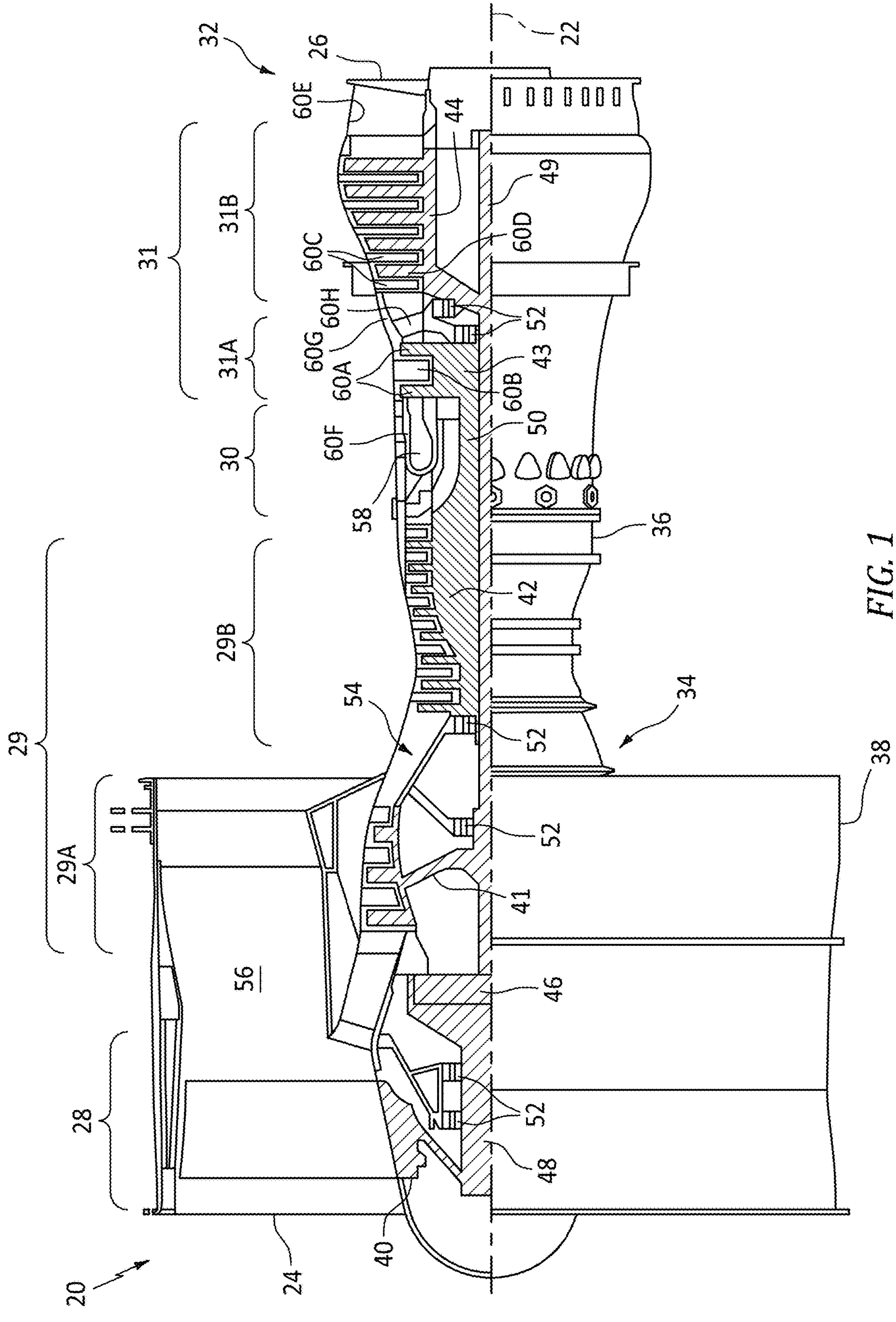
FIG. 1 is a side cutaway illustration of a geared turbofan turbine engine.

FIG. 1 illustrates an exemplary embodiment of the aircraft powerplant as a geared turbofan turbine engine 20. This turbine engine 20 extends along an axial centerline 22 between a forward, upstream airflow inlet 24 and an aft, downstream exhaust 26. The turbine engine 20 includes a fan section 28, a compressor section 29, a combustor section 30, a turbine section 31 and an exhaust section 32 (partially shown in FIG. 1). The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-32 are arranged sequentially along the axial centerline 22 within and/or formed by an engine housing 34. This engine housing 34 includes an inner case 36 (e.g., a core case) and an outer case 38 (e.g., a fan case). The inner case 36 may house and/or form one or more of the engine sections 29A-32. Briefly, at least (or only) the engine sections 29A-31B may collectively form a core of the turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed across the fan section 28 and into a core flowpath 54 (e.g., an annular core flowpath) and a bypass flowpath 56 (e.g., an annular bypass flowpath). The core flowpath 54 extends sequentially through the engine sections 29A-32. The air within the core flowpath 54 may be referred to as “core air”. The bypass flowpath 56 extends through a bypass duct, which bypass flowpath 56 and bypass duct bypass (e.g., extend around and outside of) the engine core. The air within the bypass flowpath 56 may be referred to as “bypass air”.

The core air is compressed by the LPC rotor 41 and the HPC rotor 42 and directed into a combustion chamber 58 (e.g., annular combustion chamber) of a combustor (e.g., annular combustor) in the combustor section 30. Fuel is injected into the combustion chamber 58 and mixed with the compressed core air to provide a fuel-air mixture. This fuel air mixture is ignited and combustion products thereof flow through and sequentially drive rotation of the HPT rotor 43 and the LPT rotor 44. The rotation of the HPT rotor 43 and the LPT rotor 44 respectively drive rotation of the HPC rotor 42 and the LPC rotor 41 and, thus, compression of the air received from an airflow inlet into the core flowpath 54. The rotation of the LPT rotor 44 also drives rotation of the fan rotor 40. The rotation of the fan rotor 40 propels the bypass air through and out of the bypass flowpath 56. The propulsion of the bypass air may account for a majority of thrust generated by the turbine engine 20.

The turbine engine 20 includes a plurality of fluid cooled components (e.g., 60A-H; generally referred to as "60") arranged within, for example, the combustor section 30, the turbine section 31 and/or the exhaust section 32. Examples of these fluid cooled components 60 include airfoils such as, but not limited to, a rotor blade airfoil (e.g., 60A, 60D) and a stator vane airfoil (e.g., 60B, 60C, 60H). Other examples of the fluid cooled components 60 include flowpath walls such as, but not limited to, a combustor liner (e.g., 60F), an exhaust duct liner (e.g., 60E), a shroud or other flowpath wall (e.g., 60G), a rotor blade platform and a stator vane platform. Of course, various other fluid cooled components may be included in the turbine engine 20, and the present disclosure is not limited to any particular types or configurations thereof.

Figure 2:
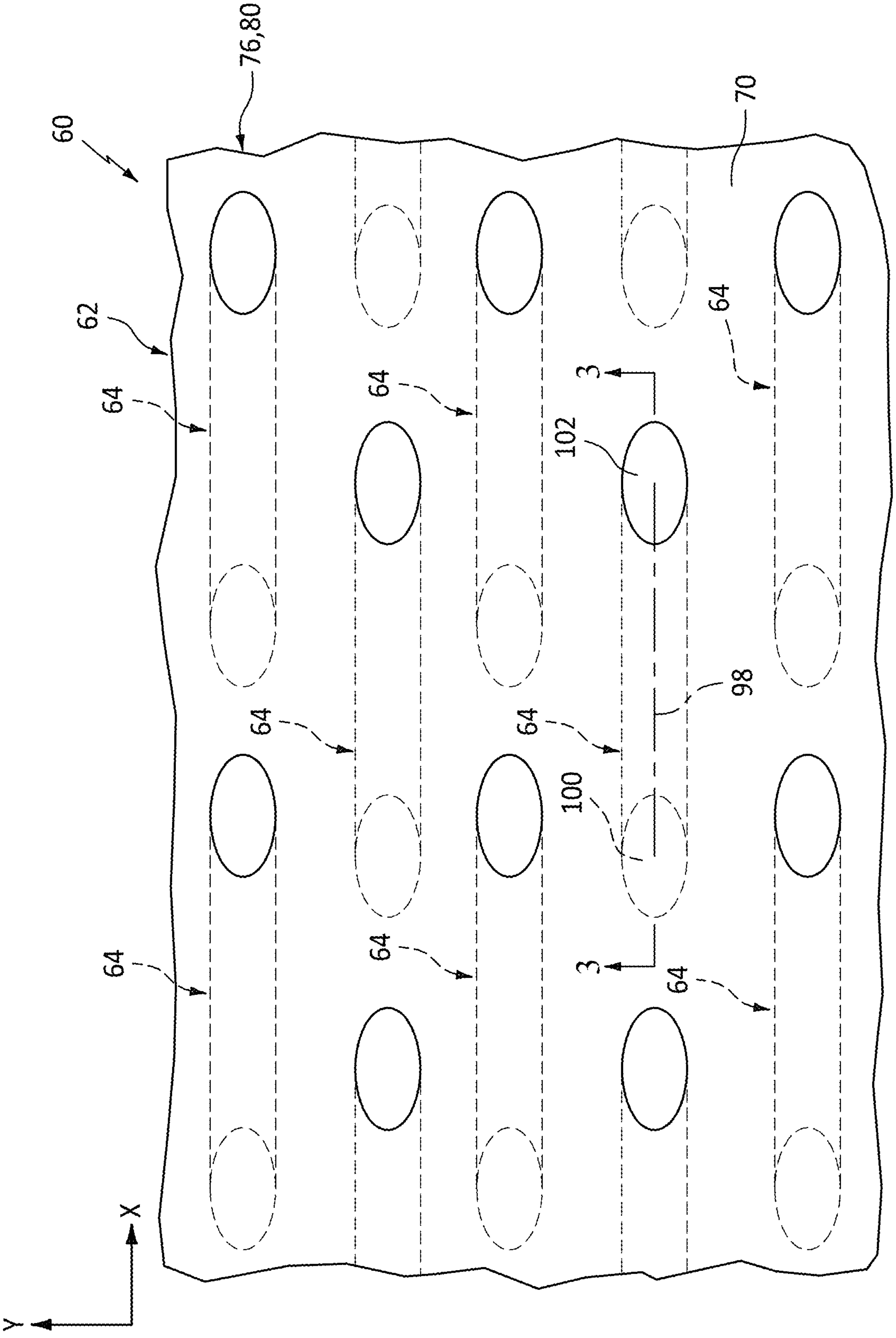
FIG. 2 is an illustration of a portion of a fluid cooled component.

FIG. 2 illustrates a portion of one of the fluid cooled components 60 within the turbine engine 20 of FIG. 1; e.g., the powerplant. This fluid cooled component 60 of FIG. 2 has a component wall 62 (e.g., a sidewall or an endwall) configured with one or more cooling apertures 64 such as effusion apertures.

Figure 3:
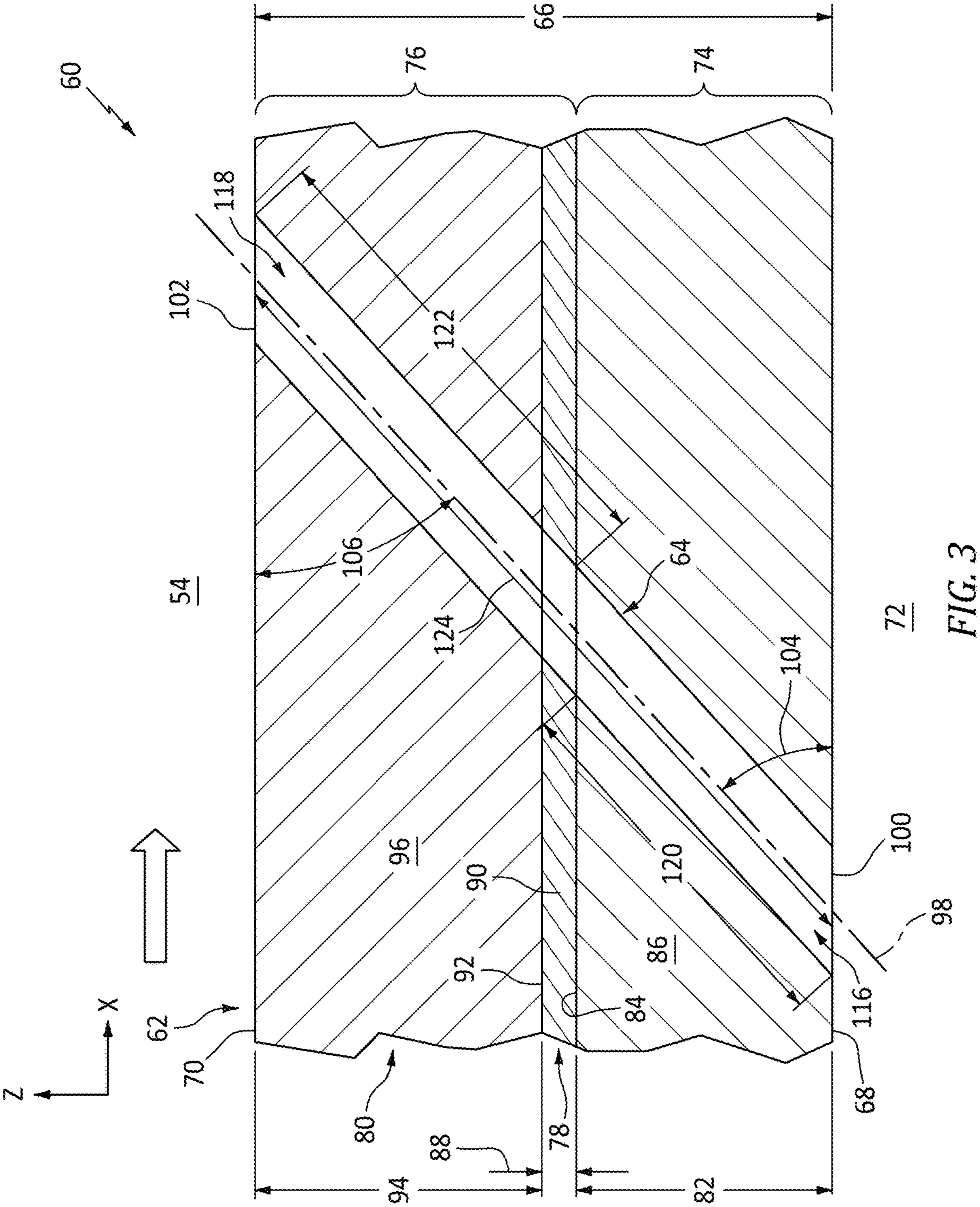
FIG. 3 is a sectional illustration of a portion of the fluid cooled component taken along line 3-3 in FIG. 2.

Referring to FIG. 3, the component wall 62 has a thickness 66 that extends vertically (e.g., along a z-axis) between and to a first surface 68 of the component wall 62 and a second surface 70 of the component wall 62. The component first surface 68 may be configured as an interior and/or a cold side surface of the component wall 62. The component first surface 68, for example, may at least partially form a peripheral boundary of a cooling fluid volume 72 (e.g., a cavity or a passage) along the component wall 62. The component first surface 68 may thereby be subject to relatively cool fluid (e.g., cooling air) supplied to the cooling fluid volume 72. This cooling fluid volume 72 may be an internal volume formed within the fluid cooled component 60 where, for example, the component 60 is an airfoil. Alternatively, the cooling fluid volume 72 may be an external volume formed external to the fluid cooled component 60 where, for example, the component 60 is a flowpath wall. The component second surface 70 may be configured as an exterior and/or a hot side surface of the component wall 62. The component second surface 70, for example, may at least partially form a peripheral boundary of a portion of, for example, the core flowpath 54 along the component wall 62. The component second surface 70 may thereby be subject to relative hot fluid (e.g., combustion products) flowing through the core flowpath 54 within, for example, one of the engine sections 29A-32 of FIG. 1.

The component wall 62 of FIG. 3 includes a component substrate 74 and a coating system 76. The coating system 76 may include one or more external component coatings 78 and 80 over the component substrate 74. Here, the component substrate 74 of FIG. 3 forms a first member (e.g., part, layer, structure, etc.) of the component wall 62, and the coating system 76 of FIG. 3 forms a second member (e.g., part, layer, structure, etc.) of the component wall 62. Similarly, the inner coating 78 of FIG. 3 forms a first member (e.g., part, layer, structure, etc.) of the coating system 76, and the outer coating 80 of FIG. 3 forms a second member (e.g., part, layer, structure, etc.) of the coating system 76. While the component members 76, 78 and 80 are generally described below as coating systems/coatings for ease of description, the present disclosure is not limited thereto. For example, the component members 78 and/or 80, or more generally the component member 76, may alternatively be applied onto the component member 74 using various other manufacturing techniques as described below in further detail.

Figure 4:
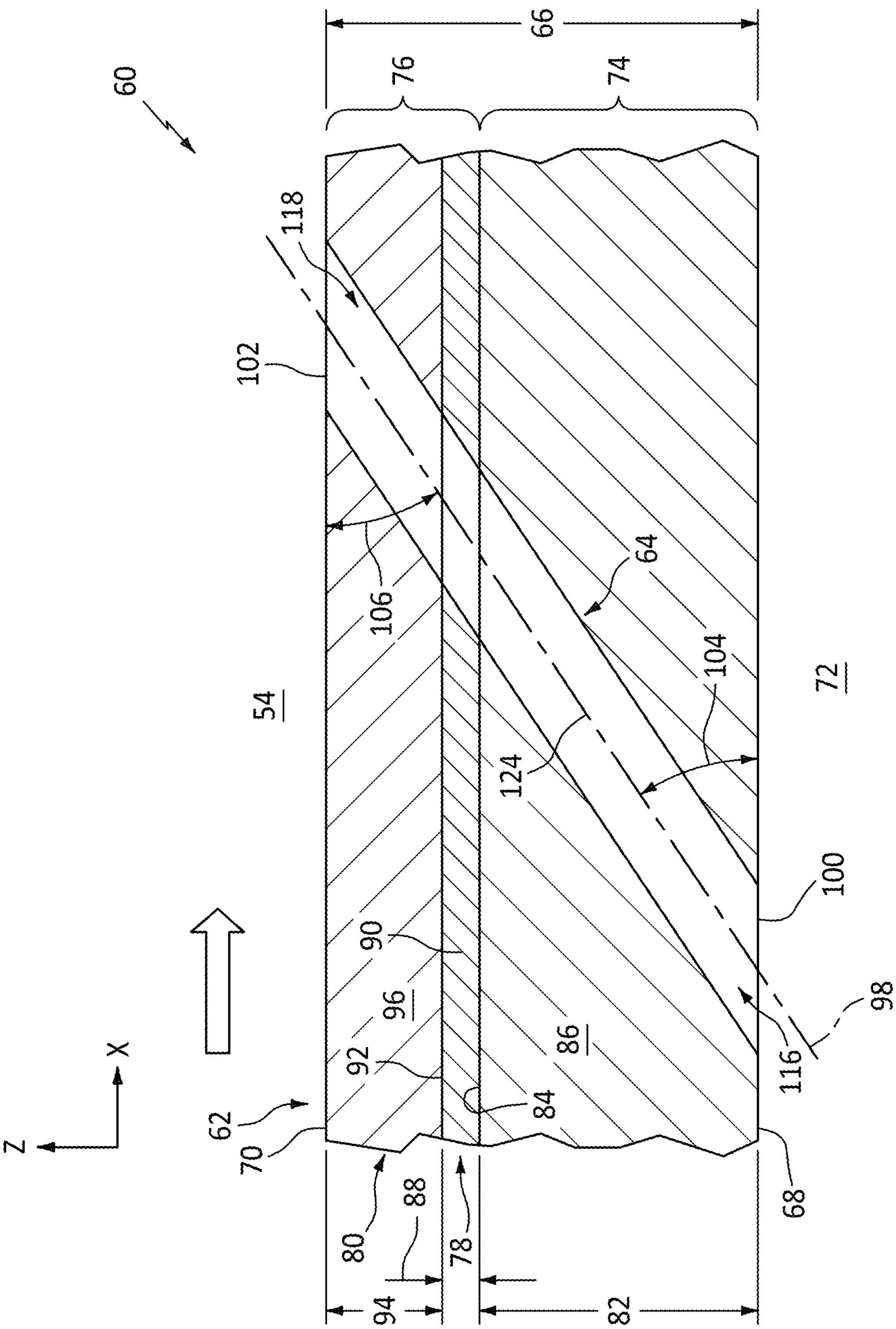
FIG. 4 is a sectional illustration of a portion of the fluid cooled component with another coating system arrangement.

The component substrate 74 at least partially or completely forms and carries the component first surface 68. The component substrate 74 has a thickness 82 that extends vertically (e.g., along the z-axis) between and to the component first surface 68 and a second surface 84 of the component substrate 74. The substrate second surface 84 may be configured as an exterior surface of the component substrate 74 prior to being (e.g., partially or completely) covered by the coating system 76 and its one or more component coatings 78 and 80. The substrate thickness 82 may be equal to or less than one-half (½) of the wall thickness 66. The substrate thickness 82, for example, may be between one-quarter (¼) and one-half (½) of the wall thickness 66, inclusive. The present disclosure, however, is not limited to such an exemplary dimensional relationship. For example, referring to FIG. 4, the substrate thickness 82 may be greater than one-half (½) of the wall thickness 66.

Referring again to FIG. 3, the component substrate 74 is constructed from substrate material 86. This substrate material 86 may be an electrically conductive material. The substrate material 86, for example, may be or otherwise include metal. Examples of the metal include, but are not limited to, nickel (Ni), titanium (Ti), aluminum (Al), chromium (Cr), cobalt (Co), and alloys thereof. The metal, for example, may be a nickel or cobalt based superalloy such as, but not limited to, PWA 1484 or PWA 1429. The present disclosure, however, is not limited to such exemplary substrate materials nor to metal substrate materials. For example, in other embodiments, it is contemplated the substrate material 86 may be a ceramic; e.g., a pure ceramic or a ceramic composite. An example of the ceramic substrate material 86 is a SiC—SiC ceramic composite.

The inner coating 78 may be configured as a bond coating between the component substrate 74 and the outer coating 80. The inner coating 78 of FIG. 3 is bonded (e.g., directly) to the substrate second surface 84. The inner coating 78 at least partially or completely covers the substrate second surface 84 (e.g., along an x-y plane of FIG. 2). The inner coating 78 has a thickness 88 that extends vertically (e.g., along the z-axis) between and to the component substrate 74 and the outer coating 80. This inner coating thickness 88 may be less than one-seventh (1/7) of the wall thickness 66. The inner coating thickness 88, for example, may be between one-eighth (⅛) and one-fortieth (1/40) of the wall thickness 66.

The inner coating 78 is constructed from inner coating material 90. This inner coating material 90 may be an electrically conductive material. The inner coating material 90, for example, may be or otherwise include metal. Examples of the metal include, but are not limited to, MCrAlY and MAlCrX, where "M" is nickel (Ni), cobalt (Co), iron (Fe) or any combination thereof, and where "Y" or "X" is hafnium (Hf), yttrium (Y), silicon (Si) or any combination thereof. The MCrAlY and MAlCrX may be further modified with strengthening elements such as, but not limited to, tantalum (Ta), rhenium (Re), tungsten (W), molybdenum (Mo) or any combination thereof. An example of the MCrAlY is PWA 286.

The inner coating 78 may be formed from a single layer of the inner coating material 90. The inner coating 78 may alternatively be formed from a plurality of layers of the inner coating material 90, where the inner coating material 90 within each of those inner coating layers may be the same as one another or different from one another.

The outer coating 80 may be configured as a protective coating for the component substrate 74 and, more generally, the fluid cooled component 60. The outer coating 80, for example, may be configured as a thermal barrier layer and/or an environmental layer. The outer coating 80 at least partially or completely forms and carries the component second surface 70. The outer coating 80 of FIG. 3 is bonded (e.g., directly) to a second (e.g., exterior) surface 92 of the inner coating 78. The outer coating 80 at least partially or completely covers the inner coating second surface 92 as well as the underlying substrate second surface 84 (e.g., along the x-y plane of FIG. 2). The outer coating 80 has a thickness 94 that extends vertically (e.g., along the z-axis) between and to the inner coating 78 and the component second surface 70. This outer coating thickness 94 may be greater than or equal to one-half (½) of the wall thickness 66. The outer coating thickness 94, for example, may be between one-half (½) and three-quarters (¾) of the wall thickness 66, inclusive. The present disclosure, however, is not limited to such an exemplary dimensional relationship. For example, referring to FIG. 4, the outer coating thickness 94 may be less than one-half (½) of the wall thickness 66.

Referring again to FIG. 3, the outer coating 80 is constructed from outer coating material 96. This outer coating material 96 may be a non-electrically conductive material. The outer coating material 96, for example, may be or otherwise include ceramic; e.g., a pure ceramic or a composite material including ceramic. Examples of the ceramic include, but are not limited to, yttria stabilized zirconia (YSZ) and gadolinium zirconate (GdZ). The outer coating material 96 of the present disclosure is not limited to non-electrically conductive materials. In other embodiments, for example, the outer coating material 96 may be an electrically conductive material; e.g., metal.

The outer coating 80 may be formed from a single layer of the outer coating material 96. The outer coating 80 may alternatively be formed from a plurality of layers of the outer coating material 96, where the outer coating material 96 within each of those outer coating layers may be the same as one another or different from one another. For example, the outer coating 80 may include a thin interior layer of the YSZ and a thicker exterior layer of the GdZ.

Each of the cooling apertures 64 extends along a longitudinal centerline 98 of the respective cooling aperture 64 from an inlet 100 into the respective cooling aperture 64 to an outlet 102 from the respective cooling aperture 64. This aperture centerline 98 may have a straight line geometry (e.g., in the x-y plane, in an x-z plane and/or in a y-z plane) from the cooling aperture inlet 100, through the component wall 62, to the cooling aperture outlet 102. The aperture centerline 98 of FIG. 3 is angularly offset from the component first surface 68 by a first angle 104, and the aperture centerline 98 is angularly offset from the component second surface 70 by a second angle 106. The first angle 104 of FIG. 3 may be equal to the second angle 106. The first angle 104 and the second angle 106 are each non-zero acute angles. The first angle 104 and the second angle 106, for example, may each be between ten degrees (10°) and eighty degrees (80°), inclusive; e.g., between twenty degrees (20°) and forty degrees (40°), between thirty degrees (30°) and fifty degrees (50°), or between forty degrees (40°) and sixty degrees (60°). Of course, in other embodiments, the first angle 104 and the second angle 106 may each be greater than eighty degrees (80°); e.g., a ninety degree (90°) right angle.

Figure 5:
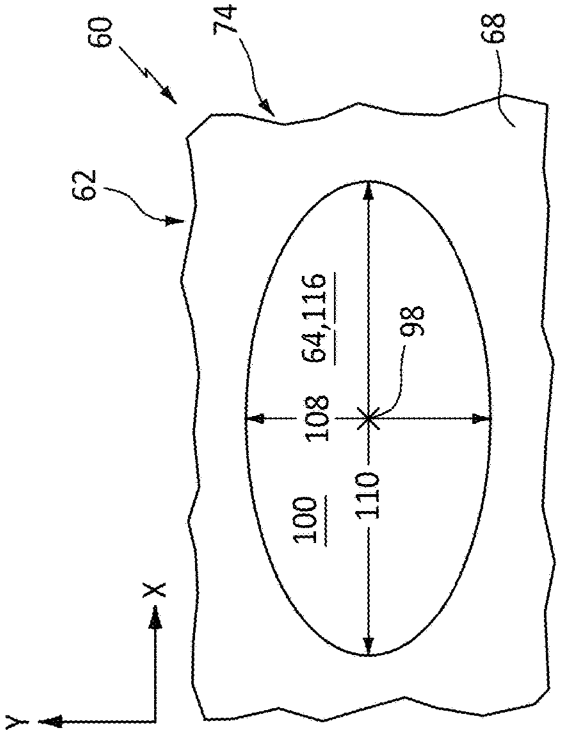
FIG. 5 is an end view illustration of an inlet to a cooling aperture in the fluid cooled component.

The cooling aperture inlet 100 of FIG. 3 is located in the component first surface 68. The cooling aperture inlet 100 thereby fluidly couples its respective cooling aperture 64 with the cooling fluid volume 72 along the component first surface 68. Referring to FIG. 5, the cooling aperture inlet 100 has a cross-sectional geometry when viewed in a reference plane parallel with the component first surface 68 at the respective cooling aperture inlet 100. This inlet geometry of FIG. 5 has a round shape (e.g., an oval shape) with a first dimension 108 (e.g., a minor axis dimension) and a second dimension 110 (e.g., a major axis dimension), where the second dimension 110 of FIG. 5 is greater than the first dimension 108.

Figure 6:
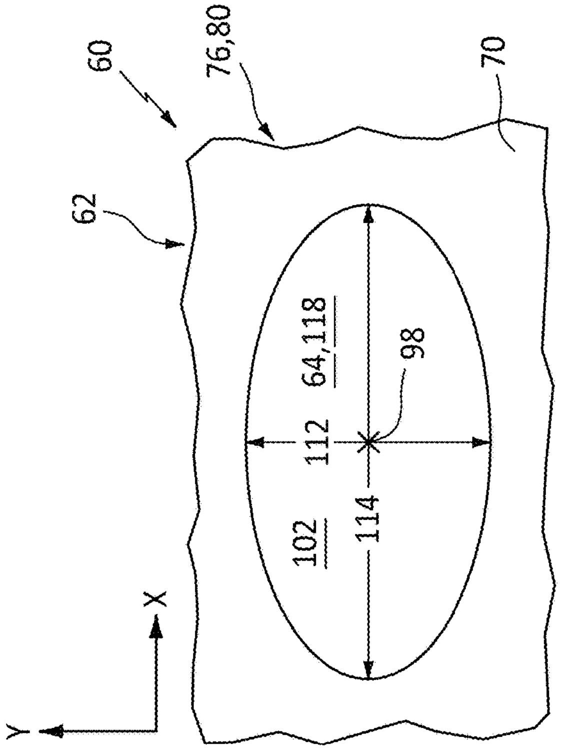
FIG. 6 is an end view illustration of an outlet from the cooling aperture in the fluid cooled component.

The cooling aperture outlet 102 of FIG. 3 is located in the component second surface 70. The cooling aperture outlet 102 thereby fluidly couples its respective cooling aperture 64 with the core flowpath 54 along the component second surface 70. Referring to FIG. 6, the cooling aperture outlet 102 has a cross-sectional geometry when viewed in a reference plane parallel with the component second surface 70 at the respective cooling aperture outlet 102. This outlet geometry of FIG. 6 has a round shape (e.g., an oval shape) with a first dimension 112 (e.g., a minor axis dimension) and a second dimension 114 (e.g., a major axis dimension), where the second dimension 114 of FIG. 6 is greater than the first dimension 112. The outlet geometry may be exactly or substantially the same as the inlet geometry of FIG. 5. For example, the cooling aperture outlet round shape of FIG. 6 may be exactly or substantially the same as the cooling aperture inlet round shape of FIG. 5. The cooling aperture outlet first dimension 112 of FIG. 6 may be exactly or substantially equal to the cooling aperture inlet first dimension 108 of FIG. 5. The cooling aperture outlet second dimension 114 of FIG. 6 may be exactly or substantially equal to the cooling aperture inlet second dimension 110 of FIG. 5. Of course, in other embodiments, it is contemplated the outlet geometry may be different in size and/or shape from the inlet geometry. With such an arrangement, the cooling aperture 64 may be provided with an upstream meter section and a downstream diffuser section.

Referring to FIG. 3, each cooling aperture 64 may be formed by at least (or only) a substrate aperture 116 and a coating aperture 118. The substrate aperture 116 extends longitudinally along the aperture centerline 98 through the component substrate 74 from the cooling aperture inlet 100 to the coating aperture 118. The coating aperture 118 extends longitudinally along the aperture centerline 98 through the coating system 76 and its members 78 and 80 from the cooling aperture outlet 102 to the substrate aperture 116. A cross-sectional geometry (e.g., shape and dimensions) of the substrate aperture 116 along a longitudinal length 120 of that substrate aperture 116 may be uniform (e.g., constant, the same) from the cooling aperture inlet 100 to the coating aperture 118. Similarly, a cross-sectional geometry (e.g., shape and dimensions) of the coating aperture 118 along a longitudinal length 122 of that coating aperture 118 may be uniform (e.g., constant, the same) from the cooling aperture outlet 102 to the substrate aperture 116. With this arrangement, a cross-sectional geometry (e.g., shape and dimensions) of the cooling aperture 64 may be uniform (e.g., the same, constant) along a longitudinal length 124 of that cooling aperture 64 from the cooling aperture inlet 100 to the cooling aperture outlet 102. Thus, each cooling aperture 64 may be configured without a diffuser section at its cooling aperture outlet 102. The term "diffuser section" may describe a section of a cooling hole with dimensions that increase as that cooling hole section extends towards/to an outlet of the cooling hole. However, as discussed above, the cooling aperture 64 may alternatively be configured with a diffuser section wholly in the coating system 76, or also extending into the component substrate 74.

Figure 7:
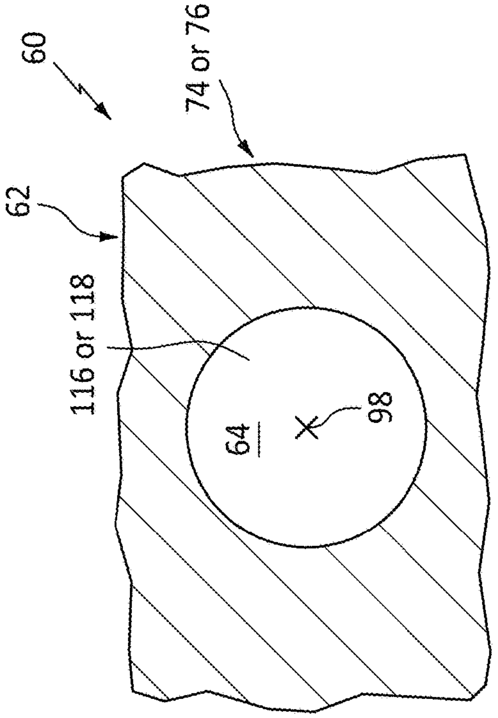
FIG. 7 is a sectional illustration through the cooling aperture in a plane perpendicular to a centerline of the cooling aperture.

Referring to FIG. 7, when viewed in a reference plane perpendicular to the aperture centerline 98, each aperture 64, 116, 118 may have a circular shape. Of course, in other embodiments, it is contemplated the aperture 64, 116, 118 may alternatively have a non-circular shape; e.g., an oval shape, etc.

Figure 8:
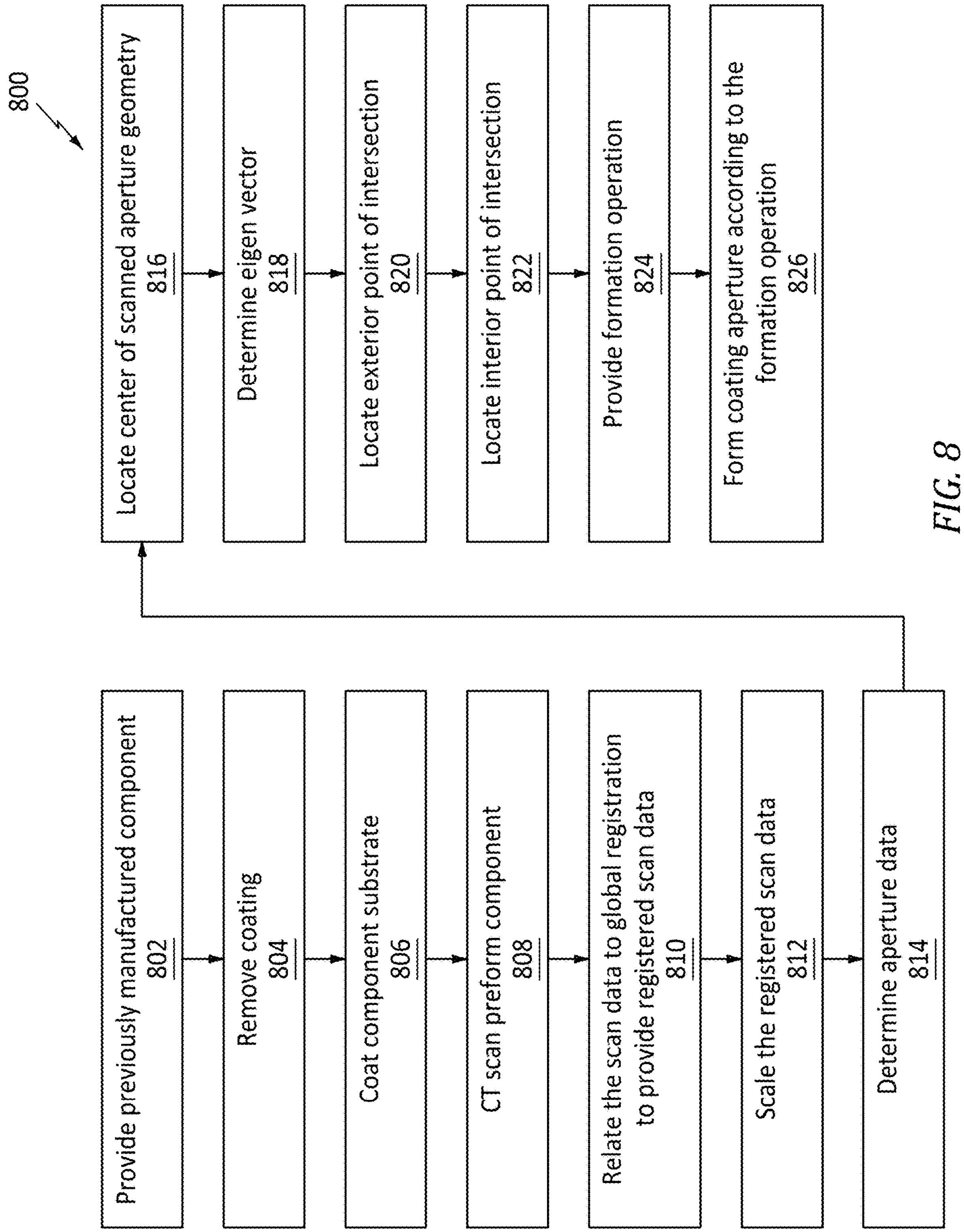
FIG. 8 is a flow diagram of a method for manufacturing a fluid cooled component.

FIG. 8 is a flow diagram of a method 800 for manufacturing a coated apertured component such as, but not limited to, a coated fluid cooled component. For ease of description, the manufacturing method 800 is described below with reference to the fluid cooled component 60 described above. The manufacturing method 800 of the present disclosure, however, is not limited to manufacturing such an exemplary fluid cooled component. Moreover, as described above, the term "manufacturing" may describe a method for forming a brand new fluid cooled component or reconditioning, repairing and/or otherwise remanufacturing a previously formed fluid cooled component. However, for ease of description, the manufacturing method 800 is described below as remanufacturing a previously formed fluid cooled component.

Figure 9:
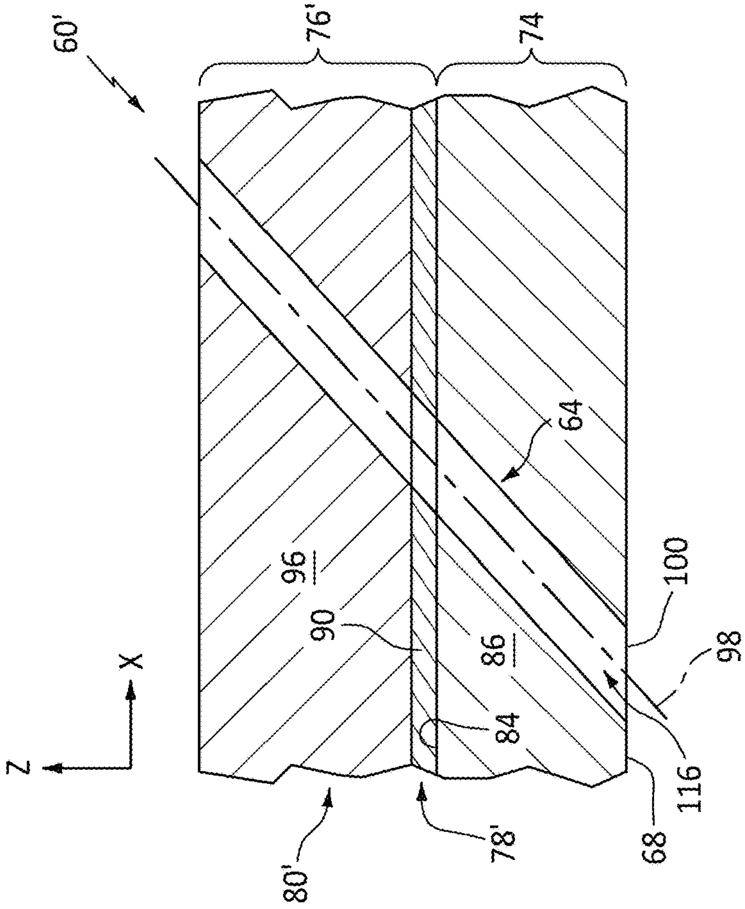
FIGS. 9-17 are sectional illustrations depicting various steps of a method for manufacturing a fluid cooled component.

In step 802, referring to FIG. 9, a previously manufactured component 60' is provided. This previously manufactured component 60' may be an eroded, worn, damaged and/or otherwise non-compliant component which was removed from the turbine engine 20 (see FIG. 1) after service (e.g., operational use) within the turbine engine 20. Alternatively, the previously manufactured component 60' may be a component which was damaged and/or is otherwise non-compliant prior to service within the turbine engine 20.

Figure 10:
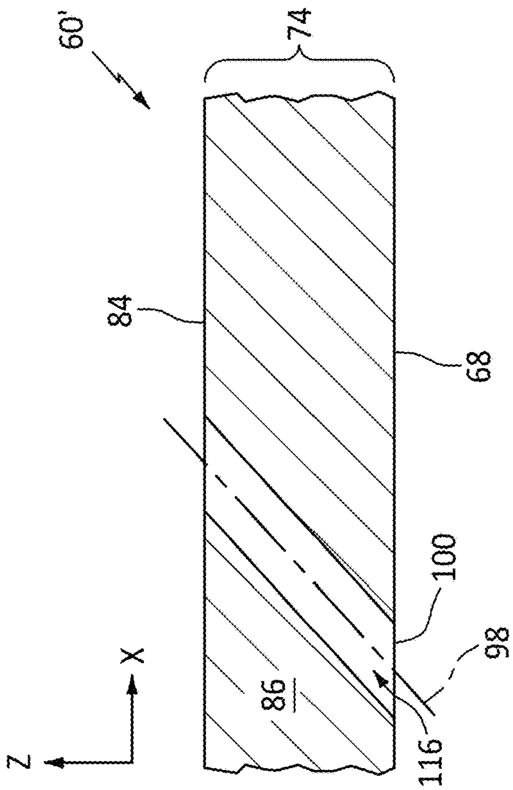

In step 804, referring to FIG. 10, a previously applied coating is removed from the component substrate 74 of the previously manufactured component 60'. Here, an entirety of the previously applied coating may be removed from the component substrate 74. Alternatively, a select portion of the previously applied coating may be removed from the component substrate 74. The previously applied coating may be partially or completely removed using one or more coating removal techniques such as, but not limited to, grit blasting, water jet removal, abrasive sanding, and/or the like.

For ease of description, the coating removal step 804 is described herein as removing an entire thickness of a previously applied coating system 76' of FIG. 9 during the coating removal. In particular, an entire thickness of a previously applied outer coating 80' and an entire thickness of a previously applied inner coating 78' to the substrate second surface 84 are removed from the component substrate 74. However, in other embodiments, it is contemplated only some or all of the thickness of the previously applied outer coating 80' may be removed. In still other embodiments, it is contemplated a selection portion of the thickness of the previously applied inner coating 78' may also be removed leaving another select portion of the previously applied inner coating 78' over the component substrate 74.

Figure 11:
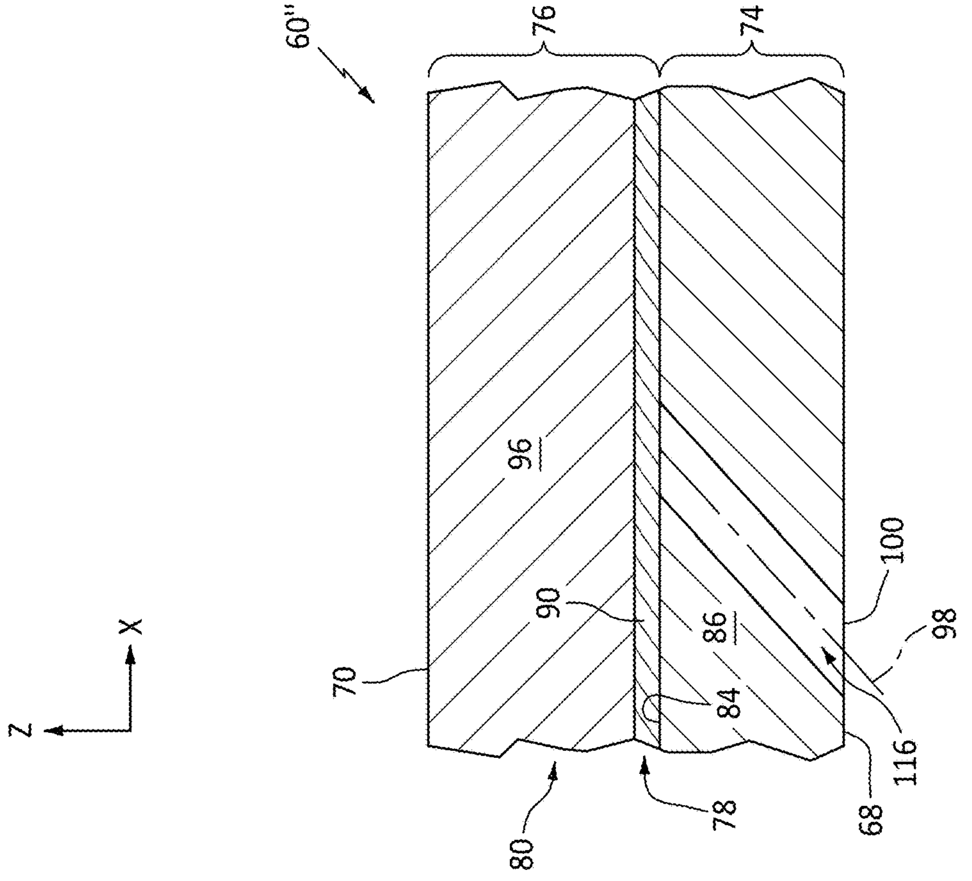

In step 806, referring to FIG. 11, the component substrate 74 is coated to provide the complete coating system 76. Where the entire thickness of the previously applied coating system 76' (see FIGS. 9-10) was removed during the coating removal step 804, the entire coating system 76 and its members 78 and 80 are applied to the component substrate 74. Following this coating step 806, the coating system 76 and its members 78 and 80 may (e.g., completely) cover and thereby visually obscure the pre-existing substrate aperture(s) 116 in the component substrate 74. This visual obscuring of the pre-existing substrate aperture(s) 116 may be particularly prevalent where the outer coating thickness 94 (see FIGS. 3 and 4) and/or a thickness of the coating system 76 is/are relatively thick; e.g., as thick as or thicker than the thickness 82 (see FIG. 3) of the underlined component substrate 74.

The inner coating material 90 may be applied (e.g., deposited) onto the substrate second surface 84 of the component substrate 74 to form the inner coating 78. The inner coating material 90 may be applied using various inner coating application techniques. Examples of the inner coating application techniques include, but are not limited to, a physical vapor deposition (PVD) process, chemical vapor deposition (CVD) process, a plating process and a thermal spray process. Examples of the thermal spray process include, but are not limited to, a plasma spray (PS) process, a high velocity oxygen fuel (HVOF) process, a high velocity air fuel (HVAF) process, a wire spray process or a combustion spray process. The inner coating application may be performed via a non-line-of-sight (NLOS) coating process or a direct-line-of-sight (DLOS) coating process.

Depending upon the inner coating material 90, the inner coating thickness 88 (see FIGS. 3 and 4) and/or the inner coating application technique, the inner coating material 90 may extend partially or completely over and cover or otherwise cap/plug an orifice of the substrate aperture 116 in the substrate second surface 84 being coated. Following the application of the inner coating 78, at least a portion or an entirety of the substrate aperture 116 may be empty. More particularly, the inner coating 78 may be applied while the substrate aperture 116 and its orifice in the substrate second surface 84 are open. Of course, it is contemplated at least a portion (or an entirety) of the substrate aperture 116 may alternatively be plugged with masking material to reduce or prevent the inner coating material 90 from entering the substrate aperture 116.

The outer coating material 96 may be applied onto the inner coating 78 to form the outer coating 80. The outer coating material 96 may be applied using various outer coating application techniques. Examples of the outer coating application techniques include, but are not limited to, a physical vapor deposition (PVD) process, chemical vapor deposition (CVD) process, a plating process and a thermal spray process. Examples of the thermal spray process include, but are not limited to, a plasma spray (PS) process, a high velocity oxygen fuel (HVOF) process, a high velocity air fuel (HVAF) process, a wire spray process or a combustion spray process. The outer coating application may be performed via a non-line-of-sight (NLOS) coating process or a direct-line-of-sight (DLOS) coating process.

Depending upon the outer coating material 96, the outer coating thickness 94 (see FIGS. 3 and 4) and/or the outer coating application technique, the outer coating material 96 may further extend over and (e.g., completely) cover or otherwise cap/plug the orifice of the substrate aperture 116. Following the application of the outer coating 80, at least a portion or the entirety of the substrate aperture 116 may be (or remain) empty. Of course, it is contemplated at least a portion (or an entirety) of the substrate aperture 116 may alternatively be plugged with masking material to reduce or prevent the outer coating material 96 from entering the substrate aperture 116.

The combination of the component substrate 74, the inner coating 78 and the outer coating 80, without the coating aperture(s) 118 (see FIG. 3), provide a preform component 60". This preform component 60" of FIG. 11 may generally have the configuration of the fluid cooled component 60 to be formed (e.g., see FIG. 3). The preform component 60" of FIG. 11, however, does not include any holes for forming the cooling apertures 64 and their coating apertures 118 through the coating system 76 and its inner and outer coatings 78 and 80.

Figure 12:
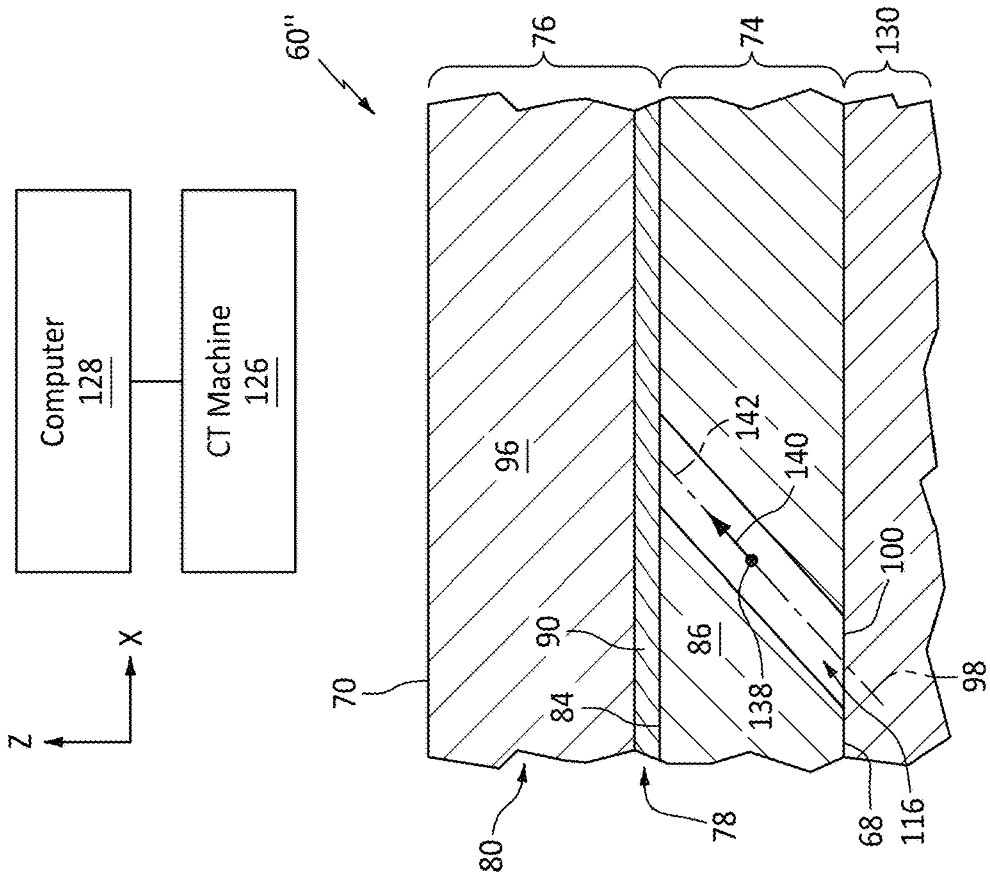

In step 808, referring to FIG. 12, the preform component 60" is computed tomography (CT) scanned using a computed tomography (CT) machine 126 to provide computed tomography (CT) scan data. This scan data includes voxel data; e.g., volumetric pixel data. Within the scan data, relatively bright voxels may represent materials forming the preform component 60"; e.g., the substrate material 86, the inner coating material 90 and/or the outer coating material 96. By contrast, relatively dark voxels may represent voids within the materials forming the preform component 60"; e.g., the substrate apertures 116 in the component substrate 74. However, for ease of description, steps of the manufacturing method 800 are described below with respect to a select single one of the substrate apertures 116. It should be noted, however, these same steps may alternatively be performed for multiple or all of the substrate apertures 116 simultaneously, one after another or otherwise.

In step 810, some or all of the scan data is related to a global registration to provide registered scan data. A computer 128 for the CT machine 126, for example, may relate the scan data to at least one global coordinate system. This global coordinate system may be defined for and tied to a fixture 130 securing the preform component 60" and its component substrate 74 during one, some or all of the manufacturing method steps. Alternatively, the global coordinate system may be defined for and tied to the preform component 60" and its component substrate 74 using, for example, one or more artifacts (e.g., tooling balls, phantoms, etc.) temporarily or permanently attached to, integrated with and/or otherwise arranged with the preform component 60". Note, where the preform component 60" is relatively large and/or has a complicated geometry, the preform component 60" may be associated with multiple global registrations. Here, each global registration may be associated with a different region of interested along the preform component 60".

For ease of description, the step 810 is described as being performed prior to performing a scaling. However, it is contemplated the step 810 may alternatively be performed following the scaling in other embodiments.

The scan data is indicative of a scanned geometry of the preform component 60". The registered scan data is indicative of the scanned geometry of the preform component 60" relative to the global coordinate system (or global coordinate systems). Under certain circumstances, the scanned geometry of the preform component 60" may be (e.g., slightly) different than an actual geometry of the preform component 60". This discrepancy between the scanned geometry of the preform component 60" and the actual geometry of the preform component 60" may be related to dimensional differences between a CT scan representation of the true object and the object itself. For example, a CT scan representation may be a voxelized (volumetric pixel) representation of the object. Based on the CT scan geometry, the data may be encoded with a voxel size of "X". Based on this encoded voxel size, objects may be located (e.g., object "A" is 3.216 voxels from object "B", meaning 3.216X units of distance). Where the CT scan geometry is slightly off because one of the machine motors is reading 12.1111 mm in position rather than the true value of 12.1112 mm as an example, this may lead to slightly incorrect values of the voxel size. Coordinates obtained from the registered scan data (or the scan data) may thereby be slightly off.

Figure 14B:
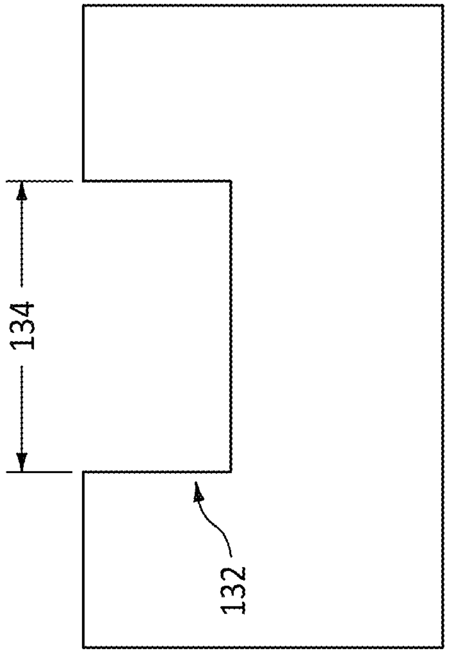
Figure 14A:
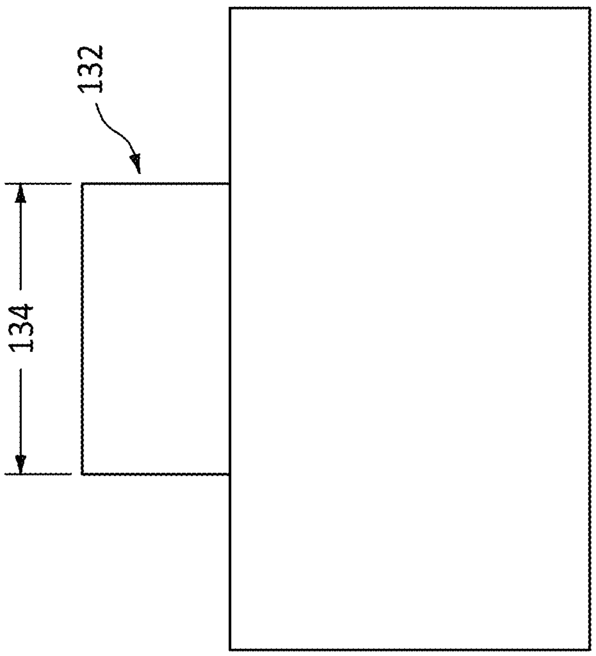
Figure 15A:
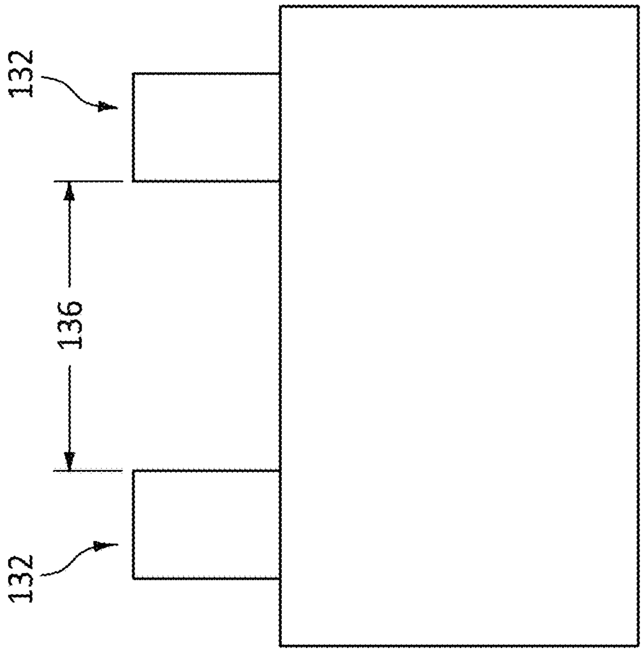
Figure 15B:
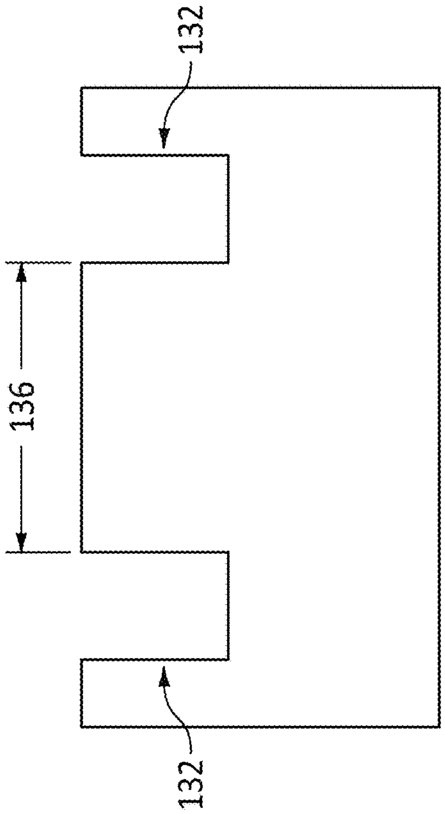

In step 812, some or all of the registered scan data (or the scan data) is scaled to provide scaled scan data. This scaling may be performed to account for any differences between the scanned geometry of the preform component 60" and the actual geometry of the preform component 60". For example, referring to FIGS. 13A-C, the preform component 60" may be scanned along with one or more artifacts 132 (e.g., objects, protrusions, apertures, etc.) during the scanning step 808. These one or more artifacts 132 is/are associated with known dimensional data. For example, each artifact 132 in FIGS. 14A and 14B has a known (e.g., premeasured, precisely formed, etc.) artifact size 134; e.g., width, length, height, diameter, etc. In another example, each set of artifacts 132 in FIGS. 15A and 15B has a known (e.g., premeasured, precisely formed, etc.) inter-artifact measurement 136; e.g., a distance between boundaries of the artifacts 132, a distance between centers (e.g., centroids) of the artifacts 132, etc.

Figure 13B:
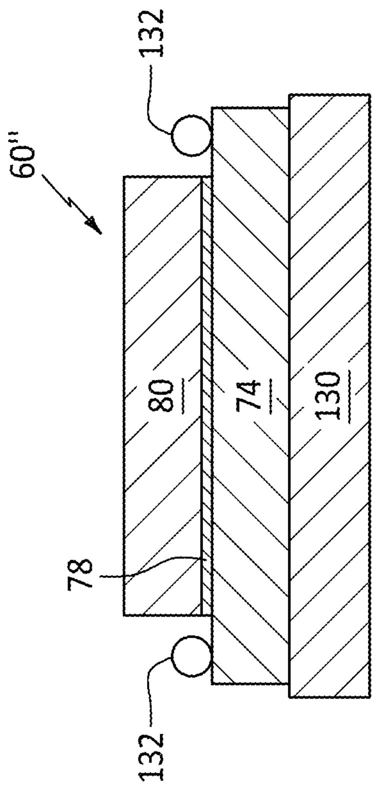
Figure 13C:
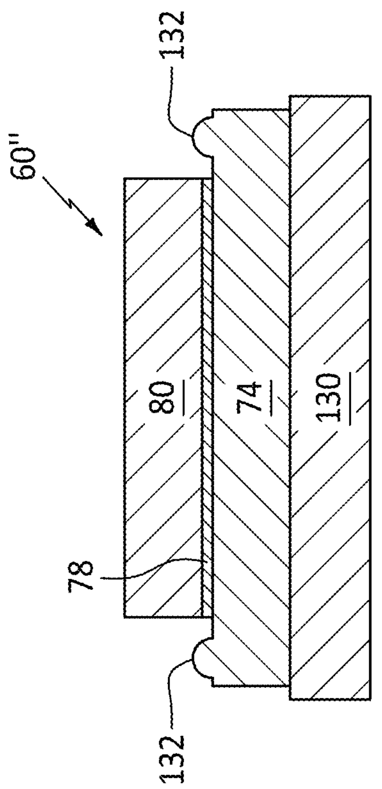
Figure 13A:
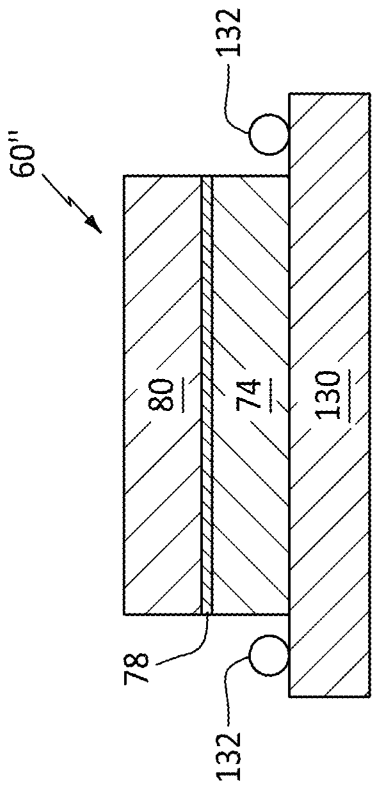

To perform the scaling step 812, the computer 128 of FIG. 12 may process the registered scan data (or the scan data) to determine unscaled dimensional data (e.g., raw dimensional data) for the one or more artifacts 132 (see FIGS. 13A-C). The computer 128 may compare this unscaled dimensional data to the known dimensional data in order to determine a scale parameter. The computer 128 may subsequently scale the registered scan data (or the scan data) using the scale parameter to provide the scaled scan data. Note, this scaling may be performed for each axis (e.g., an x-axis, a y-axis, a z-axis) of the global coordinate system (or global coordinate systems).

In some embodiments, referring to FIGS. 13A and 13B, one or more or all of the artifacts 132 may be discrete from the preform component 60". Referring to FIG. 13A, one, some or all of these artifacts 132 may be mounted with (e.g., attached to) the fixture 130. Referring to FIG. 13B, one, some or all of these artifacts 132 may alternatively (or also) be mounted with (e.g., attached to) the preform component 60". In other embodiments, referring to FIG. 13C, one or more or all of the artifacts 132 may alternatively (or also) be included as an integral part of the preform component 60" and, for example, its component substrate 74.

In step 814, aperture data for the scanned substrate aperture 116 of FIG. 12 is determined. The computer 128, for example, may process the scaled scan data using various techniques (e.g., thresholding, etc.) to determine the aperture data. The aperture data is indicative of a scanned (e.g., volumetric) geometry of the scanned substrate aperture 116; e.g., a grouping of the relatively dark voxels representing the scanned substrate aperture 116. The aperture data may include one or more Cartesian coordinates (e.g., x-y-z coordinates) and/or one or more unit vector coordinates (e.g., i-j-k coordinates) associated with the Cartesian coordinates. Note, while this step 814 is described above as being performed following the scaling step 812, it is contemplated the scaling may alternatively be performed on the aperture data.

In step 816, a center 138 of the scanned geometry of the scanned substrate aperture 116 is located. The computer 128, for example, may process the aperture data to determine a centroid of the scanned geometry of the scanned substrate aperture 116. The center 138 of the scanned geometry may be defined as being located at the centroid of the scanned geometry.

In step 818, an eigen vector 140 for the scanned geometry of the scanned substrate aperture 116 is determined. The computer 128, for example, may process the aperture data to determine the eigen vector 140 at the center 138 of the scanned geometry; e.g., the centroid of the scanned geometry. This eigen vector 140 is coincident with the center 138 of the scanned geometry. For example, an origin of the eigen vector 140 may be the center 138 of the scanned geometry. The eigen vector 140 may also be (e.g., substantially or exactly) coaxial with a centerline axis 142 of the scanned geometry of the scanned substrate aperture 116 (e.g., a gun-barrel type axis for the scanned substrate aperture 116), where the centerline axis 142 extends through the center 138 of the scanned geometry; e.g., the centroid of the scanned geometry.

Figure 16:
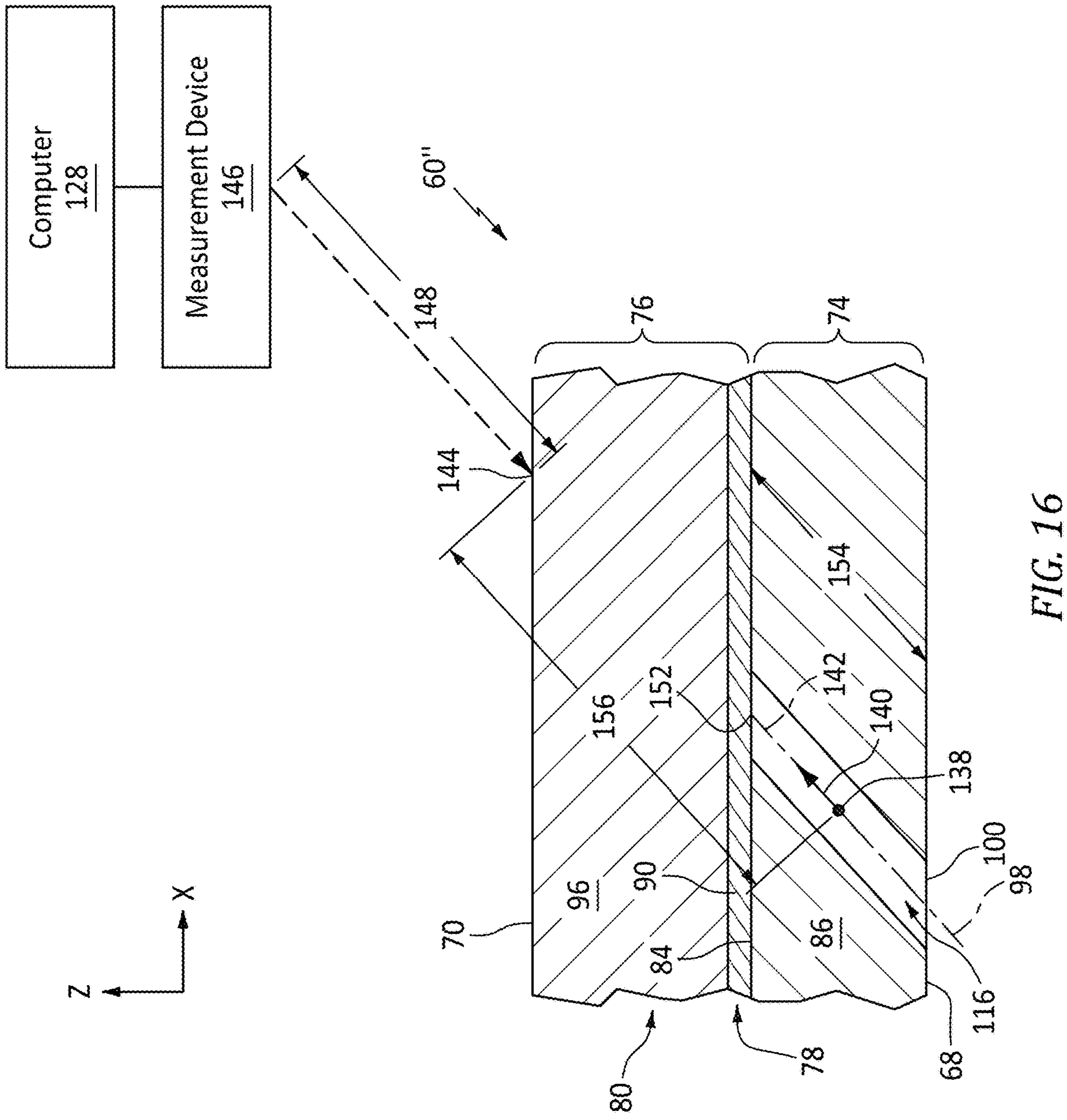

In step 820, referring to FIG. 16, an exterior point of intersection 144 between the centerline axis 142 and the component second surface 70 (e.g., an exterior surface of the preform component 60" and its outer coating 80) is located. A measurement device 146, for example, may be oriented to measure a distance 148 along the centerline axis 142 to the component second surface 70. This distance 148 along with information regarding the eigen vector 140 and/or the centerline axis 142 may be processed by the computer 128 to spatially locate the exterior point of intersection 144 within the respective global coordinate system, and relative to the center location of the scanned geometry. The measurement device 146 may be a non-contact measurement device or a tactile (e.g., contact) measurement device. Examples of the non-contact measurement device include, but are not limited to, a konoscope, an autofocus for an aperture formation device 150 (e.g., see FIG. 17) such as a laser drilling machine, and a structured light inspection device (e.g., a white or a blue light inspection device). An example of the tactile measurement device is a coordinate measurement machine (CMM).

In step 822, an interior point of intersection 152 between the centerline axis 142 and an interface between the coating system 76 and the component substrate 74 is located. The computer 128, for example, may process data associated with the locations of the exterior point of intersection 144 and the center 138 of the scanned geometry; e.g., the centroid of the scanned geometry. For example, where the component substrate 74 has a known or determinable thickness 154 along the centerline axis 142, the computer 128 may locate the interior point of intersection 152 by subtracting one-half (½) of the component substrate thickness 154 from a distance 156 between the exterior point of intersection 144 and the center 138 of the scanned geometry. Here, the component substrate thickness 154 may be determined based on the known thickness 82 (see FIGS. 3 and 4) of the component substrate 74 and the eigen vector 140.

Figure 17:
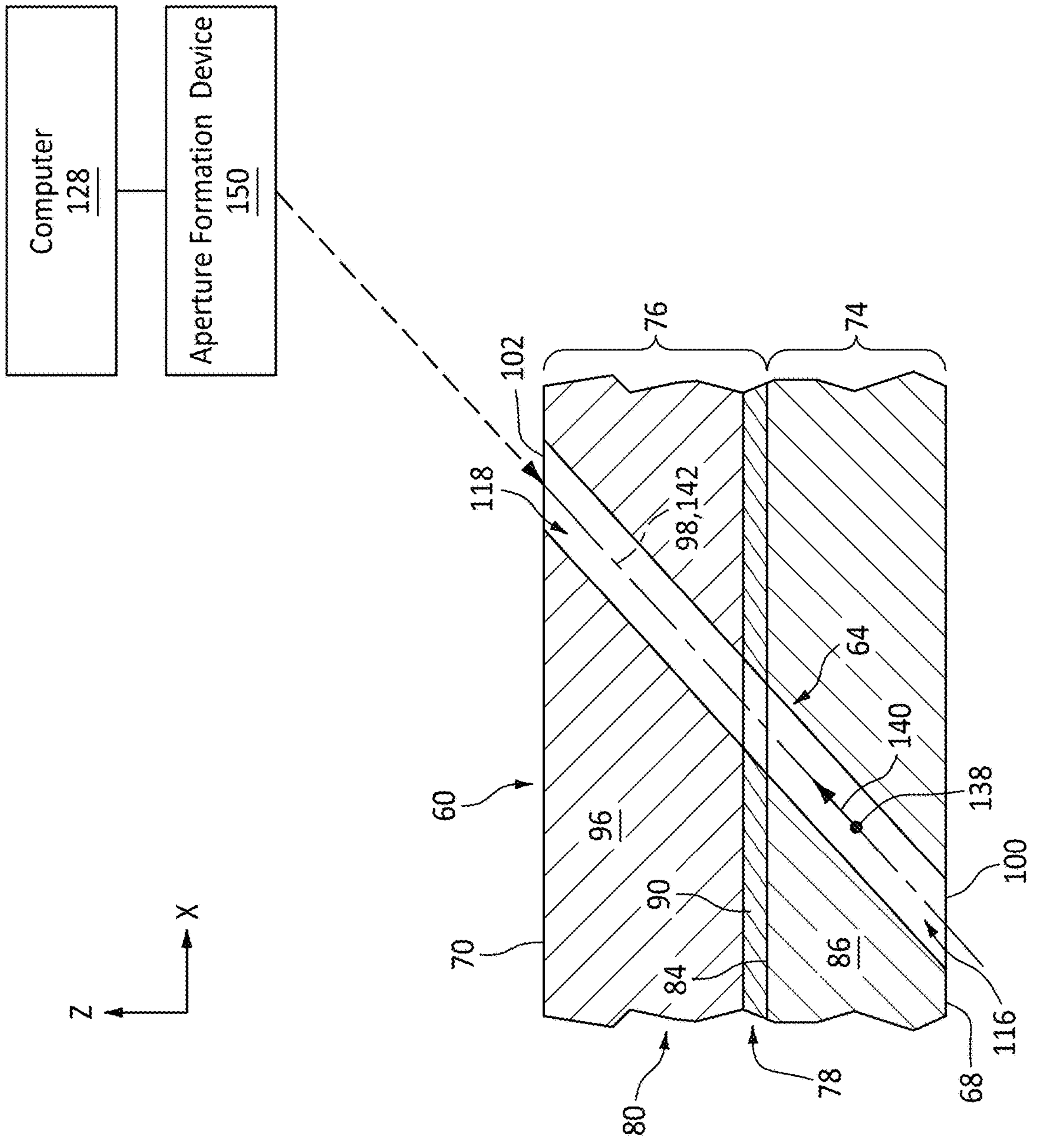

In step 824, referring to FIG. 17, a formation operation is determined, tailored and/or otherwise provided for forming a coating aperture 118 using the computer 128. This formation operation includes one or more instructions for the aperture formation device 150. These instructions are provided to facilitate alignment between the to-be-formed coating aperture 118 and the already-formed substrate aperture 116. The computer 128 may determine the instructions based on (a) the interior point of intersection 152 (see FIG. 16) and (b) the eigen vector 140 and/or the centerline axis 142 (e.g., for orienting the aperture formation device 150).

In step 826, the coating aperture 118 is formed in the coating system 76 according to the formation operation. The computer 128, for example, may provide the instructions to the aperture formation device 150. The aperture formation device 150 may subsequently form the coating aperture 118 in the coating system 76 using the instructions and, thus, according to the formation operation. With this methodology, the formed coating aperture 118 is aligned with the already-formed substrate aperture 116 to form a respective one of the cooling apertures 64. The formation of the cooling apertures 64 in the coating system 76 may provide a (e.g., final) step in manufacturing (e.g., remanufacturing, or original manufacturing) of the fluid cooled component 60. Of course, in other embodiments, one or more additional finishing operations may also be performed subsequent to the aperture forming step 826.

The coating aperture 118 may be formed in the coating system 76 using a coating machining process. This coating machining process may be or otherwise include a laser drilling process such as, but not limited to, a percussion laser drilling process, a trepanning laser drilling process, or a scanning laser drilling process. The manufacturing method 800 of the present disclosure, however, is not limited to such exemplary laser drilling processes nor to use of a laser. The coating aperture 118, for example, may alternatively (or also) be formed using one or more other machining processes such as, but not limited to, an electron beam machining process, a water jet drilling process, an electrical discharge machining (EDM) process (e.g., where the coating material(s) are electrically conductive), or a mechanical drilling process.

Using the foregoing methodology to facilitate alignment of the (e.g., reformed) coating aperture 118 with the previously formed substrate aperture 116 may improve overall cooling aperture quality. For example, where the apertures 116 and 118 are aligned, little or no damage (e.g., chipping, etc.) at an intersection between the apertures 116 and 118 may be caused during the aperture formation step 826 due to, for example, unexpected shoulders caused from misalignment. Moreover, alignment between the apertures 116 and 118 improves airflow through the respective cooling aperture 64.

The manufacturing method 800 may utilize various drilling references for providing the formation operation depending on various parameters. These parameters include, but are not limited to: the specific type and/or configuration of the aperture formation device 150; variable(s) input into operational software for the aperture formation device 150; and/or clarity of the scan data; etc. Examples of the drilling reference(s) include, but are not limited to: the exterior point of intersection 144; the interior point of intersection 152; the location of the center 138 of the scanned geometry; the eigen vector 140; and/or the centerline axis 142 of the substrate aperture 116. Moreover, while select techniques are described above for determining certain information from the aperture data, it is contemplated one or more other techniques may alternatively (or also) per utilized. For example, it is contemplated the computer 128 may virtually fit one or more geometric primitives to the aperture data and/or the scan data to facilitate provision of the drilling reference(s).

In some embodiments, one or more of the component members 78 and/or 80, or more generally the component member 76, may be applied and/or otherwise formed onto the base component member—the substrate 74—using various coating techniques as described above. In other embodiments, however, one or more of the component members 78 and/or 80, or more generally the component member 76, may alternatively be applied and/or otherwise formed via welding, brazing, field assisted sintering technology (FAST) bonding and/or additive manufacturing. One or more of the component members 78 and/or 80, or more generally the component member 76, may still alternatively be applied by welding, brazing and/or otherwise bonding a preformed object (e.g., a repair preform, etc.) to the base component member—the substrate 74. The present disclosure therefore is not limited to any particular component manufacturing techniques.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of manufacture, comprising:

scanning a component with one or more artifacts using a computed tomography machine to provide scan data, wherein the component includes a first member and a second member covering the first member, and the first member includes a first member aperture extending through the first member to the second member;

scaling the scan data using known dimensional data for the one or more artifacts to provide scaled scan data;

determining aperture data for the first member aperture based on the scaled scan data, wherein the aperture data is indicative of a scanned geometry of the first member aperture;

determining a first drilling reference based on the aperture data; and forming a second member aperture in the second member according to a formation operation that aligns the second member aperture being formed with the first member aperture in the first member, wherein the formation operation is determined using the first drilling reference.

2. The method of claim 1, wherein the one or more artifacts comprise a first artifact with a known size; and the known dimensional data is indicative of the known size of the first artifact.

3. The method of claim 1, wherein the one or more artifacts comprise a first artifact and a second artifact with a known distance between the first artifact and the second artifact; and the known dimensional data is indicative of the known distance between the first artifact and the second artifact.

4. The method of claim 1, wherein the one or more artifacts comprise a first artifact discrete from and arranged with the component.

5. The method of claim 1, wherein the one or more artifacts comprise a first artifact attached to the component.

6. The method of claim 1, wherein the component is mounted with a fixture during the scanning and the forming; and the one or more artifacts comprise a first artifact attached to the fixture.

7. The method of claim 1, wherein the one or more artifacts comprise a first artifact; and the component comprises the first artifact.

8. The method of claim 1, wherein the first drilling reference is indicative of an exterior point of intersection between (a) an exterior surface of the second member and (b) a centerline of the scanned geometry of the first member aperture.

9. The method of claim 1, wherein the first drilling reference is indicative of an interior point of intersection between (a) an interface between the first member and the second member and (b) a centerline of the scanned geometry of the first member aperture.

10. The method of claim 1, wherein the first drilling reference is indicative of a centerline of the scanned geometry of the first member aperture.

11. The method of claim 1, wherein the first drilling reference is indicative of a center of the scanned geometry of the first member aperture.

12. The method of claim 1, wherein the aperture data is related to a global registration.

13. The method of claim 1, wherein the second member aperture is formed in the second member using a laser.

14. The method of claim 1, wherein the second member aperture is formed in the second member using a water jet.

15. The method of claim 1, wherein the second member aperture is formed in the second member using a mechanical drill.

16. The method of claim 1, wherein the first member is a ceramic substrate.

17. The method of claim 1, wherein the first member is a metal substrate, and the second member comprises a ceramic material.

18. The method of claim 1, wherein the first member is a metal substrate, and the second member comprises a metallic material.

19. A method of manufacture, comprising:

computed tomography scanning an engine component and one or more artifacts to provide scan data, wherein the engine component includes a first member and a second member on the first member, the first member includes a first member aperture extending through the first member, the second member covers an end of the first member aperture, and the one or more artifacts comprise a first artifact discrete from and arranged with the engine component;

scaling the scan data using known dimensional data for the one or more artifacts to provide scaled scan data;

determining aperture data for the first member aperture based on the scaled scan data, wherein the aperture data is indicative of a scanned geometry of the first member aperture;

determining a first drilling reference based on the aperture data;

tailoring a formation operation to align a second member aperture to be formed in the second member with the first member aperture already formed in the first member based on the first drilling reference; and forming the second member aperture in the second member according to the formation operation.

20. A method of manufacture, comprising:

computed tomography scanning an engine component to provide scan data, wherein the engine component includes a first member, a second member and one or more artifacts, the first member includes a first member aperture extending through the first member, the second member is disposed over the first member and covers an end of the first member aperture, and the one or more artifacts comprise a first artifact configured as a part of the engine component;

scaling the scan data using known dimensional data for the one or more artifacts to provide scaled scan data;

determining aperture data for the first member aperture based on the scaled scan data, wherein the aperture data is indicative of a scanned geometry of the first member aperture;

determining a first drilling reference based on the aperture data;

tailoring a formation operation to align a second member aperture to be formed in the second member with the first member aperture already formed in the first member based on the first drilling reference; and forming the second member aperture in the second member according to the formation operation.

* * * * *